US012809753B2

(12) United States Patent
Liu et al.

(10) Patent No.: US 12,809,753 B2
(45) Date of Patent: Nov. 24, 2026

(54) ADAPTIVE UPDATE METHOD OF SIGNAL DATA FOR BUS SIMULATION AND TEST PROCESS

(71) Applicant: SHANGHAI TOSUN TECHNOLOGY LTD., Shanghai (CN)

(72) Inventors: Chu Liu, Shanghai (CN); Yueyin Xie, Shanghai (CN); Mang Mo, Shanghai (CN)

(73) Assignee: SHANGHAI TOSUN TECHNOLOGY LTD., Shanghai (CN)

(*) Notice: Subject to any disclaimer, the term of this patent is extended or adjusted under 35 U.S.C. 154(b) by 237 days.

(21) Appl. No.: 18/664,494

(22) Filed: May 15, 2024

(65) Prior Publication Data

US 2025/0238349 A1 Jul. 24, 2025

(30) Foreign Application Priority Data

Jan. 18, 2024 (CN) ......................... 202410073686.0

(51) Int. Cl.
*G06F 11/3668* (2025.01)

(52) U.S. Cl.
CPC ................................ *G06F 11/3672* (2013.01)

(58) Field of Classification Search
None
See application file for complete search history.

(56) References Cited

U.S. PATENT DOCUMENTS

| | | | |
|---|---|---|---|
| 8,813,137 | B2 | 8/2014 | Morley et al. |
| 9,036,826 | B2 | 5/2015 | Thyssen et al. |

(Continued)

FOREIGN PATENT DOCUMENTS

| | | | |
|---|---|---|---|
| CN | 112415943 | A | 2/2021 |
| CN | 113190783 | A | 7/2021 |

(Continued)

OTHER PUBLICATIONS

MKT-SYS.de, CAN Message Generator / Bus-Simulator, 2023, pp. 1-14, XP093259301, retrieved from: https://web.archive.org/web/20230924164137/https://www.mkt-sys.de/MKT-CD/upt/help/CANSimulator_49.htm.

*Primary Examiner* — Qing Chen
(74) *Attorney, Agent, or Firm* — Bayramoglu Law Offices LLC

(57) ABSTRACT

An adaptive update method of signal data includes: setting a mapping expression between a source signal and a target signal to a linear type, and configuring mapping parameters: a mapping amplification factor, an offset amount and a mapping direction; or, setting the mapping expression between the source signal and the target signal to a nonlinear type, and configuring parameters of the mapping expression; where a method of configuring the parameters of the mapping expression includes: based on a number n of the source signals, creating independent variables x1, x2 . . . xn; setting the mapping expression to y=f (x1, x2 . . . xn); associating each independent variable with the signal in a system or an expression result y; and storing the mapping expression, the mapping parameters or the parameters of the mapping expression into a mapping execution container to create a mapping relationship between the source signal and the target signal, and activating the mapping relationship.

19 Claims, 7 Drawing Sheets

(56) References Cited

U.S. PATENT DOCUMENTS

| | | | | |
|---|---|---|---|---|
| 2003/0107595 | A1 * | 6/2003 | Ciolfi | G06F 8/34 715/762 |
| 2011/0022374 | A1 * | 1/2011 | Benayon | G06F 8/34 703/13 |
| 2017/0103143 | A1 * | 4/2017 | Kumar | G06F 16/9024 |
| 2025/0005035 | A1 * | 1/2025 | Alli | G06F 8/34 |

FOREIGN PATENT DOCUMENTS

| | | | |
|---|---|---|---|
| CN | 113557704 | A | 10/2021 |
| CN | 116112556 | A | 5/2023 |
| CN | 116519350 | A | 8/2023 |
| CN | 116684278 | A | 9/2023 |
| CN | 116974222 | A | 10/2023 |
| CN | 117093329 | A | 11/2023 |
| JP | 2008131063 | A | 6/2008 |
| JP | 2021117748 | A | 8/2021 |
| JP | 2022042011 | A | 3/2022 |
| JP | 2023057532 | A | 4/2023 |
| JP | 2024503971 | A | 1/2024 |
| KR | 100641970 | B1 | 11/2006 |
| RU | 2639959 | C2 | 12/2017 |
| WO | 2022135876 | A1 | 6/2022 |

* cited by examiner

ADAPTIVE UPDATE METHOD OF SIGNAL DATA FOR BUS SIMULATION AND TEST PROCESS

CROSS-REFERENCE TO THE RELATED APPLICATIONS

This application is based upon and claims priority to Chinese Patent Application No. 202410073686.0, filed on Jan. 18, 2024, the entire contents of which are incorporated herein by reference.

TECHNICAL FIELD

The present disclosure relates to the field of vehicular software development technologies, and in particular to an adaptive update method of signal data for bus simulation and test process.

BACKGROUND

In the bus simulation and test process based on bus tool, it is usually required to process a received bus signal in real time to generate a desired virtual signal. In vehicular software development process, the virtual signal refers to a signal set by artificial logic and not present in measurement data. For example, the signals such as bus load rate signal, peak load rate signal, frame rate signal, a sum of any signal values of A signal value and B signal value, addition, multiplication, subtraction, division, absolute value, arccosine, sine, arctangent, cosine, involution and rooting, logarithm, maximum and minimum, sine and tangent and the like are all virtual signals, which can complete subsequent bus simulation and test data analysis requirements.

In the relevant bus tools, there is no direct solution for performing real-time processing on the bus signals to generate desired virtual signals. This is because the major service functions of the bus tools are bus signal collection and sending and do not cover abstract information virtualization and real-time computation functions. If real-time processing scripts are forcefully added to the bus tools to generate desired virtual signals, the configurations of the scripts and parameters will be very complex due to diversity of signal types and occupy the system resources, affecting the real-time effect of the bus signal processing and hence affecting the bus simulation and test efficiency.

SUMMARY

The object of the present disclosure is to provide an adaptive update method of signal data for bus simulation and test process, comprising:

at step S101, setting a mapping expression between a source signal and a target signal to a linear type, and configuring mapping parameters: a mapping amplification factor, an offset amount and a mapping direction; or, setting the mapping expression between the source signal and the target signal to a nonlinear type, and configuring parameters of the mapping expression; wherein, a method of configuring the parameters of the mapping expression comprises:

based on a number n of the source signals, creating independent variables x1, x2 . . . xn;

setting the mapping expression to y=f (x1, x2 . . . xn);

associating each independent variable with the signal in a system or an expression result y;

at step S102, storing the mapping expression, the mapping parameters or the parameters of the mapping expression into a mapping execution container to create a mapping relationship between the source signal and the target signal, and activating the mapping relationship to realize adaptive update of signal data.

The summary of the present disclosure aims to provide brief descriptions for the subjects of the specification. Thus, it should be understood that the above features are only illustrative and shall not be interpreted as narrowing the scope or essence of the subject of the specification in any way.

Other features, aspects and advantages of the subjects of the present disclosure will become apparent by way of the specific embodiments, drawings and claims.

BRIEF DESCRIPTION OF THE DRAWINGS

In order to more clearly describe the technical solutions in the embodiments of the present disclosure or in the prior arts, the drawings required for descriptions of the specific embodiments or the prior arts will be briefly introduced. Apparently, the drawings described hereunder are only some embodiments of the present disclosure. Those skilled in the arts can obtain other drawings based on these drawings without making creative work.

DETAILED DESCRIPTION OF THE EMBODIMENTS

Figure 1:
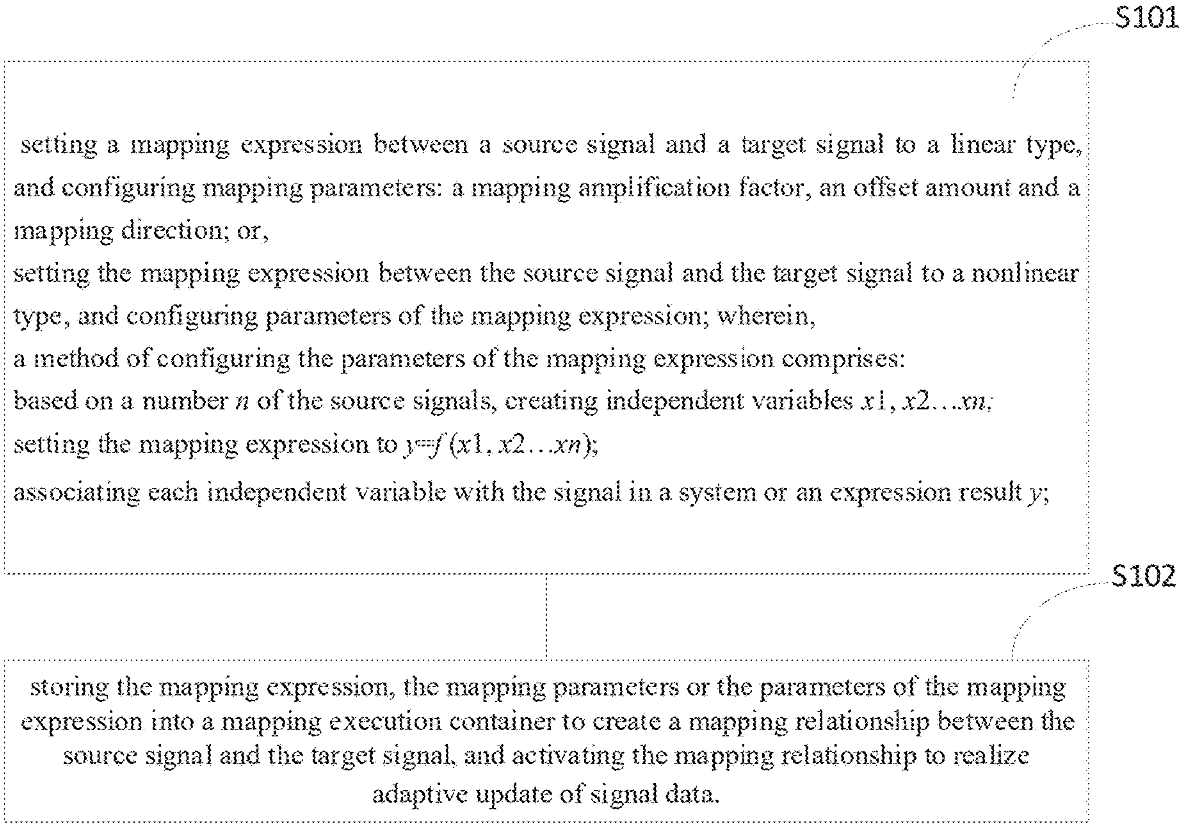
FIG. 1 is a diagram illustrating steps of an adaptive update method of signal data according to some embodiments of the present disclosure.

In order to make the object, technical solutions and advantages of the embodiments of the present disclosure clearer, the technical solutions of the present disclosure will be fully and clearly described in combination with drawings. Apparently, the embodiments described herein are only some embodiments rather than all embodiments. All other embodiments obtained by those skilled in the art based on these drawings without making creative work shall fall within the scope of protection of the present disclosure.

In the bus simulation and test process based on bus tool, it is usually required to process a received bus signal in real time to generate a desired virtual signal. In vehicular software development process, the virtual signal refers to a signal set by artificial logic and not present in measurement data. For example, the signals such as bus load rate signal, peak load rate signal, frame rate signal, a sum of any signal values of A signal value and B signal value, addition, multiplication, subtraction, division, absolute value, arccosine, sine, arctangent, cosine, involution and rooting, logarithm, maximum and minimum, sine and tangent and the like are all virtual signals, which can complete subsequent bus simulation and test data analysis requirements.

In the relevant bus tools, there is no direct solution for performing real-time processing on the bus signal to generate desired virtual signal. This is because the major service functions of the bus tools are bus signal collection and sending and do not cover abstract information virtualization and real-time computation functions. If real-time processing scripts are forcefully added to the bus tools to generate desired virtual signal, the configurations of the scripts and parameters will be very complex due to diversity of signal types and occupy the system resources, affecting the real-time effect of the bus signal processing and hence affecting the bus simulation and test efficiency.

Therefore, at least one embodiment provides an adaptive update method of signal data to achieve the purpose of performing real-time processing on bus signal only with a mapping expression and hence satisfy adaptive update requirements of signal data. The method may include the following steps:

at step S101, setting a mapping expression between a source signal and a target signal to a linear type, and configuring mapping parameters: a mapping amplification factor, an offset amount and a mapping direction; or, setting the mapping expression between the source signal and the target signal to a nonlinear type, and configuring parameters of the mapping expression; wherein, a method of configuring the parameters of the mapping expression includes:

based on a number n of the source signals, creating independent variables x1, x2 . . . xn;

setting the mapping expression to y=f (x1, x2 . . . xn);

associating each independent variable with the signal in a system or an expression result y; and at step S102, storing the mapping expression, the mapping parameters or the parameters of the mapping expression into a mapping execution container to create a mapping relationship between the source signal and the target signal, and activating the mapping relationship to realize adaptive update of signal data.

In the adaptive update method of signal data, without writing programs to perform special processing on bus signal, the user can achieve real-time processings on the bus signal only by using the mapping expression. These processings include:

(1) performing mathematical operation, for example, addition, subtraction, multiplication and division, on two or more bus signal values;

(2) drawing a curve using the result signal obtained by the above operation;

(3) deploying a logic to test the result of the above operation.

In this way, the problem of difficulty in performing real-time updating processing on the desired virtual signal in the bus simulation and test process is solved and thus the bus simulation and test efficiency can be improved.

The method of processing the bus signal by using the adaptive update method of signal data will be described with one case below.

In a vehicular chassis test process, it is required to verify whether the ABS function is triggered in an entire braking process in which the vehicle speed is higher than 50 kph and the primary cylinder pressure is greater than 80 bar. In a traditional test method, it is required to write scripts to perform tracking detection, for example, on three pieces of signal data: the vehicle speed V, the primary cylinder pressure M and the ABS trigger flag A. In the adaptive update method of signal data, only the following steps are used.

1. The expression y=(x1>50) & (x2>80) & (x3=1) is established, where x1 is the vehicle speed signal data V, x2 is the primary cylinder pressure signal data M, x3 is the ABS trigger flag A, and y is a new flag R when the vehicle speed is higher than 50 kph, and the primary cylinder pressure is greater than 80 bar and the ABS trigger flag is activated. If this flag is activated, it means that three signals are activated at the same time. Thus, it is only required to determine the signal data of the new flag R.
2. The new flag R is dragged from a signal list of the system into a graphics window of a vehicle bus tool, such that the graphics window can draw, on itself, a signal data curve of the new flag R.
3. By using a signal detection function provided by the vehicle bus tool, it is detected whether the signal data of the new flag R jumps from 0 to 1 in a test process.

From the above case, it can be known that the adaptive update method of signal data can increase the test verification efficiency without writing one line of processing codes.

Various non-limiting implementations of the embodiments of the present disclosure will be detailed below in combination with drawings.

As shown in FIG. 1, some embodiments provide an adaptive update method of signal data, which includes:

at step S101, setting a mapping expression between a source signal and a target signal to a linear type, and configuring mapping parameters: a mapping amplification factor, an offset amount and a mapping direction; or, setting the mapping expression between the source signal and the target signal to a nonlinear type, and configuring parameters of the mapping expression; wherein, a method of configuring the parameters of the mapping expression includes:

based on a number n of the source signals, creating independent variables x1, x2 . . . xn;

setting the mapping expression to y=f (x1, x2 . . . xn);

associating each independent variable with the signal in a system or an expression result Y;

at step S102, storing the mapping expression, the mapping parameters or the parameters of the mapping expression into a mapping execution container to create a mapping relationship between the source signal and the target signal, and activating the mapping relationship to realize adaptive update of signal data.

Specifically, the mapping execution container refers to a container for storing and executing mapping and has the following functions: 1) storing the mapping expression and the mapping parameters in a list; 2) importing and exporting the list storing the mapping expression and the mapping parameters; 3) automatically executing the mapping relationship to achieve mapping from the source signal to the target signal or from the target signal to the source signal or achieve bidirectional mapping.

In some embodiments, when the mapping expression between the source signal and the target signal is a linear type, the mapping expression is set to y=x.

When the mapping expression between the source signal and the target signal is a nonlinear type, the mapping expression is set to an expression: y is unequal to x, where x is the source signal which may be received bus signal or system variables in the bus tool system, and the system variables may be existing variables in the bus tool system or virtual signal generated by bus signal mapping; y is the target signal which refers to mapping system variables generated on a local computer and related to the source signal. The mapping system variables are computational results of the expression and may also be involved in the arithmetic logic operation of the expression at the same time.

A method of setting the mapping amplification factor, the offset amount and the mapping direction when the mapping expression y=x is set will be detailed below with one case.

It is assumed that in a vehicular ESC system function test, it is required to monitor a vehicle speed signal and use the value of the vehicle speed signal in various test conditions.

Therefore, it is required to establish unidirectional mapping from the vehicle speed CAN signal to the mapping system variable "VehicleSpeed". That is, the mapping expression y=x is set, where y refers to the mapping system variable "VehicleSpeed"; x refers to the vehicle speed CAN signal, for example, "0/CAN_FD_ESC/ESC/ESCData/VehSpd", which means: channel 1, CAN network CAN_FD_ESC, ESC node, ESCData message, VehSpd signal.

Based on the mapping expression, three mapping parameters the mapping amplification factor a, the offset amount δ and the mapping direction may be set. In this case, the mapping direction is fixed as from CAN signal to the mapping system variable and thus the actual value of the mapping system variable "VehicleSpeed" is:

$$VehicleSpeed = a * VehSpd + \delta;$$

When the units of the mapping system variable VehicleSpeed and the speed CAN signal VehSpdare both "km/h" or "m/s", a=1 and δ=0.

When the unit of the mapping system variable VehicleSpeed is "km/h" and the unit of the CAN signal VehSpdis "m/s", a=3.6 and δ=0, so as to ensure unification of two variable physics quantities.

When the unit of the mapping system variable VehicleSpeed is "m/s" and the unit of the CAN signal VehSpdis "km/h", a=1/3.6 and δ=0, so as to ensure unification of two variable physics quantities.

A method of configuring the parameters of the mapping expression when the mapping expression y is unequal to x is set will be detailed below with one case.

It is assumed that, in a vehicular ESC system function test, it is required to check whether other specific flags are in on state when the vehicle speed is from 40 km/h to 60 km/h and the ESC function is enabled. At this time, it is required to use one mapping expression created using the vehicle speed signal and the ESC function enable signal:

$$y = (x1 > 40) \,\&\, (x1 < 60) \,\&x2;$$

wherein y refers to a flag that the vehicle speed is from 40 km/h to 60 km/h and the ESC function is enabled, x1 refers to the vehicle speed CAN signal, x2 refers to the ESC function enable flag CAN signal; the symbol ">" refers to logic greater than, and the symbol "<" refers to logic less than, the symbol "&" refers to logic and, and the obtained result is also a logic value, True or False.

Based on this mapping expression, the mapping parameters are set, namely, the mapping relationship of the independent variables x1 and x2 in the mapping expression is configured. In this case, x1 may associate "0/CAN_FD_ESC/ESC/ESCData/VehSpd", which means: channel 1, CAN network CAN_FD_ESC, ESC node, ESCData message, VehSpd signal; x2 may associate "0/CAN_FD_ESC/ESC/ESCData/ESCActv", which means: channel 1, CAN network CAN_FD_ESC, ESC node, ESCData message, ESCActv signal.

When the vehicle speed is 50 km/h and the ESC function is enabled, if x1=50 and x2=True, y can be finally obtained as y=True based on the mapping expression, that is, the condition that the vehicle speed is from 40 km/h to 60 km/h and the ESC function enable is established. When the vehicle speed is 70 km/h, and the ESC function is not enabled, if x1=70 and x2=False, y can be finally obtained as y=False based on the mapping expression, that is, the condition that the vehicle speed is from 40 km/h to 60 km/h and the ESC function enable is not established.

In some embodiments, the mapping direction includes unidirectional mapping and bidirectional mapping.

The unidirectional mapping includes mapping from the source signal to the target signal or from the target signal to the source signal;

The bidirectional mapping includes mapping from the source signal to the target signal while mapping from the target signal to the source signal.

Only output or only input is unidirectional mapping. For example, in the case of only output: it is required to output a voltage signal or a current signal to drive an external device; at this time, the direction of the unidirectional mapping is mapping from the target signal to the source signal, where the target signal is a mapping system variable carrying control information and the source signal is a CAN signal representing voltage or current control information; in the case of only input: it is required to monitor an external voltage or current signal to draw a curve or carry out relevant test determination; at this time, the direction of the unidirectional mapping is mapping from the source signal to the target signal, wherein the source signal is a monitoring CAN signal representing an external voltage or current, and the target signal is a corresponding mapping system variable.

The bidirectional mapping is used in the scenarios requiring both input and output. For example, for the maximum signal of the current of the electromagnetic valve, in a case of output, the mapping system variable i corresponding to the maximum can be modified by the bus tool, for example, can be reset to 0; in a case of input, it can be used to monitor a regional peak of the current of the electromagnetic valve. For example, upon test instance startup, the bus tool writes the reset value 0 into the mapping system variable i to clear the last test result and start a new round of current peak monitoring; in a test instance running process, the bus tool cyclically reads the mapping system variable i to achieve real-time monitoring for the current peak of this round.

In some embodiments, when mapping is performed from the source signal to the target signal, a method of calculating a target signal value is:

$$Mz = Yz * a + \delta;$$

and when mapping is performed from the target signal to the source signal, a method of calculating a source signal value is $$Yz = (Mz - \delta)/a;$$

wherein Mz is the target signal value; Yz is the source signal value; a is the mapping amplification factor; and δ is the offset amount.

The methods of calculating the target signal value when mapping is performed from the source signal to the target signal and calculating the source signal value when mapping is performed from the target signal to the source signal will be described in details below with one case.

When read and write is performed on the maximum signal of the current of the electromagnetic valve, the target signal is set to the corresponding mapping system variable i measured in the unit of ampere (A), and the source signal is set to a maximum signal CurrMax of a current of an electromagnetic valve of the vehicular ECU measured in the unit of milliampere (mA). It is required to create bidirectional mapping to achieve bidirectional mapping from the source signal to the target signal and from the target signal to the source signal.

When mapping is performed from the source signal to the target signal, a method of calculating a target signal value is:

$$i = CurrMax * a + \delta;$$

wherein i is a value of the mapping system variable of the target signal, CurrMax is a value of the source signal from the CAN bus, a=0.001 and δ=0.

When mapping is performed from the target signal to the source signal, a method of calculating a source signal value is:

$$CurrMax = (i - \delta)/a$$

wherein i is a value of the mapping system variable of the target signal, CurrMax is a value of the source signal from the CAN bus, a=0.001 and δ=0.

In some embodiments, when the mapping expression is that y is unequal to x, a method of configuring the parameters of the mapping expression includes:

based on a number n of the source signals, creating independent variables x1, x2 . . . xn;

setting the mapping expression to y=f (x1, x2 . . . xn);

associating each independent variable with the signal in a system or an expression result Y;

A method of configuring the parameters of the mapping expression when the mapping expression y is unequal to x is set will be detailed below with one case.

It is assumed that, in a vehicular ESC system function test, it is required to check whether other specific flags are in on state when the vehicle speed is from 40 km/h to 60 km/h and the ESC function is enabled. At this time, it is required to use one mapping expression created using the vehicle speed signal and the ESC function enable signal:

$$y = (x1 > 40)\ \&\ (x1 < 60)\ \&x2;$$

wherein y refers to a flag that the vehicle speed is from 40 km/h to 60 km/h and the ESC function is enabled, x1 refers to the vehicle speed CAN signal, x2 refers to the ESC function enable flag CAN signal; the symbol “>” refers to logic greater than, and the symbol “<” refers to logic less than, the symbol “&” refers to logic and, and the obtained result is also a logic value, True or False.

Based on this mapping expression, the mapping parameters are set, namely, the mapping relationship of the independent variables x1 and x2 in the mapping expression is configured. In this case, x1 may associate “0/CAN_FD_ESC/ESC/ESCData/VehSpd”, which means: channel 1, CAN network CAN_FD_ESC, ESC node, ESCData message, VehSpd signal; x2 may associate “0/CAN_FD_ESC/ESC/ESCData/ESCActv”, which means: channel 1, CAN network CAN_FD_ESC, ESC node, ESCData message, ESCActv signal.

When the vehicle speed is 50 km/h and the ESC function is enabled, if x=50 and x2=True, y can be finally obtained as y=True based on the mapping expression, that is, the condition that the vehicle speed is from 40 km/h to 60 km/h and the ESC function enable is established. When the vehicle speed is 70 km/h, and the ESC function is not enabled, if x=70 and x2=False, y can be finally obtained as y=False based on the mapping expression, that is, the condition that the vehicle speed is from 40 km/h to 60 km/h and the ESC function enable is not established.

In some embodiments, the signal in the system includes one or more of a bus signal, a mapping system variable, a constant and an immediate number.

In some embodiments, a method of storing the mapping expression and the mapping parameters into the mapping execution container to create the mapping relationship between the source signal and the target signal includes: storing a, δ, a type value of the mapping direction and Mz=Yz*a+δ into the mapping execution container.

The method of storing the mapping expression and the mapping parameters into the mapping execution container to create the mapping relationship between the source signal and the target signal will be detailed below with one case.

It is assumed that, when monitoring is performed on an ECU supply voltage, the target signal is set to the mapping system variable v corresponding to the ECU supply voltage, measured in the unit of Volt (V), and the source signal is set to the vehicular ECU supply voltage VMon measured in the unit of millivolt (mV). It is required to create unidirectional mapping from the source signal to the target signal. A method of calculating a target signal value is:

$$v = VMon * a + \delta;$$

wherein a=0.001 and δ=0.

In order to create the unidirectional mapping from the source signal to the target signal, it is required to store the above mapping expression and the mapping parameters as one record into the mapping execution container. This record has the following contents:

(1) a=0.001

(2) δ=0

(3) the type value of the mapping direction=from source signal to target signal (4) the calculation formula of the target signal value is v=VMon*a+δ.

The method of storing the mapping expression and the mapping parameters into the mapping execution container to create the mapping relationship between the source signal and the target signal includes:

storing a, δ, a type value of the mapping direction and Yz=(Mz−δ)/a into the mapping execution container.

The method of storing the mapping expression and the mapping parameters into the mapping execution container to create the mapping relationship between the source signal and the target signal will be detailed below with one case.

It is assumed that when the drive current of the ECU electromagnetic valve is controlled, the target signal is set to the mapping system variable i corresponding to the drive current of the ECU electromagnetic valve, measured in the unit of ampere (A), and the source signal is set to the drive current iDrv of the vehicular ECU electromagnetic valve, measured in the unit of milliampere (mA). It is required to create unidirectional mapping from the target signal to the source signal. The method of calculating a source signal value is:

$$iDrv = (i - \delta)/a$$

wherein a=0.001 and δ=0.

In order to create the unidirectional mapping from the target signal to the source signal, it is required to store the above mapping expression and the mapping parameters as one record into the mapping execution container. This record has the following contents:

(1) a=0.001
(2) δ=0
(3) the type value of the mapping direction=from target signal to source signal
(4) the calculation formula of the source signal value is iDrv=(i−δ)/a.

A method of storing the mapping expression and the parameters of the mapping expression into the mapping execution container to create the mapping relationship between the source signal and the target signal includes:

storing the number n of the source signals, the mapping expression y=f (x1, x2 . . . xn) and information for associating each independent variable with the signal in the system into the mapping execution container.

The method of storing the mapping expression and the parameters of the mapping expression into the mapping execution container to create the mapping relationship between the source signal and the target signal will be detailed below with one case.

It is assumed that in a vehicular ESC system function test, it is required to check whether other specific flags are in on state when the vehicle speed is from 40 km/h to 60 km/h and the ESC function is enabled. At this time, it is required to use one mapping expression created using the vehicle speed signal and the ESC function enable signal:

$$y = (x1 > 40)\ \&\ (x1 < 60)\ \&x2$$

wherein y refers to a flag that the vehicle speed is from 40 km/h to 60 km/h and the ESC function is enabled, x1 refers to the vehicle speed CAN signal, x2 refers to the ESC function enable flag CAN signal.

In order to create the above mapping relationship between the source signal and the target signal, it is required to store the following mapping expression and the parameters of the mapping expression into the mapping execution container:

(1) the mapping expression: y=(x1>40) & (x1<60) &x2
(2) the number of the source signals n=2
(3) independent variable x1="0/CAN_FD_ESC/ESC/ESCData/VehSpd"
(4) independent variable x2="0/CAN_FD_ESC/ESC/ESCData/ESCActv".

In some embodiments, the method of activating the mapping relationship includes: setting an execution switch of the mapping execution container to be on.

Figure 2:
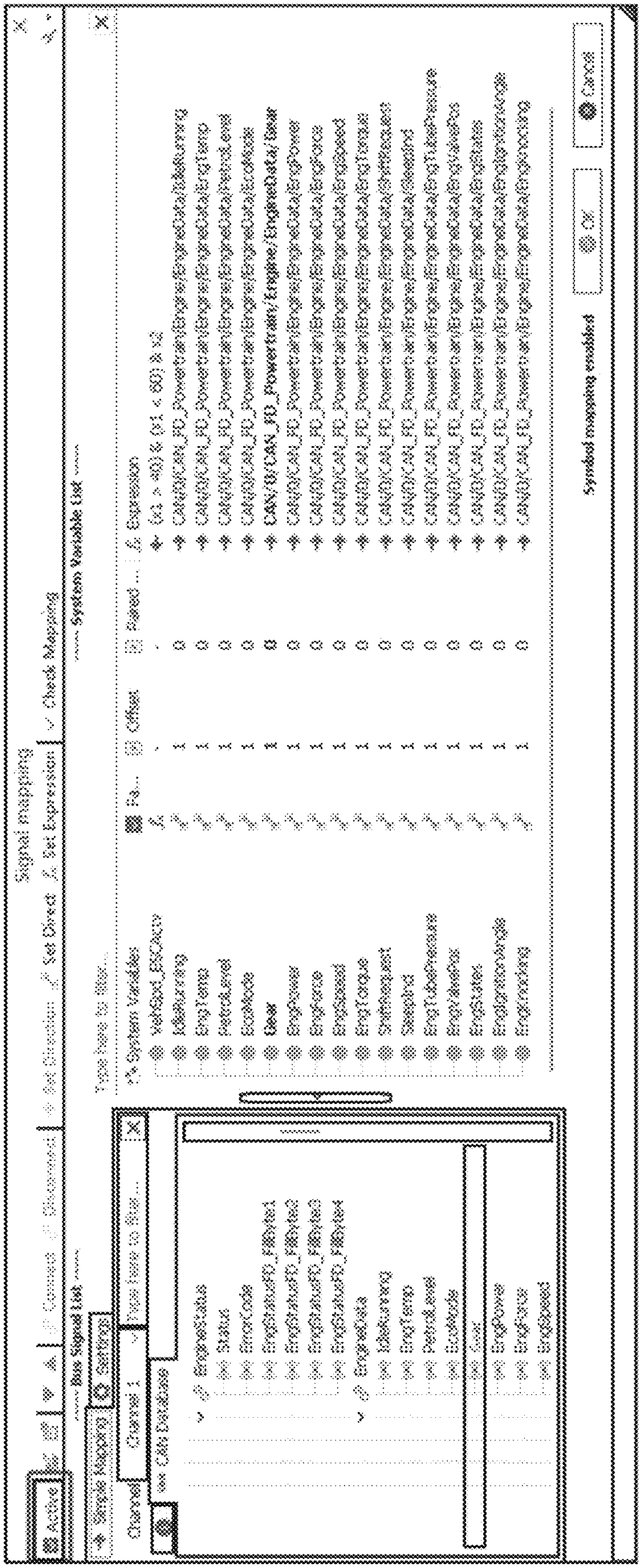
FIG. 2 is a schematic diagram illustrating a case of an adaptive update method of signal data according to some embodiments of the present disclosure.

As shown in FIG. 2, the "activate" button is ticked in the signal mapping setting interface, and thus the execution switch of the mapping execution container is set to be on.

For various application scenarios, for example, when y is equal to x, and y is unequal to x, one complete case is supplemented respectively.

The adaptive update method of signal data will be detailed below with one complete case.

It is assumed that in a vehicle test, it is required to monitor a change of a gear while drawing in real time a change curve of the gear in a curve diagram. In this case, it is required to create unidirectional mapping from the source signal to the target signal. First, the mapping expression y=x is set, where y is the target signal which refers to a mapping system variable corresponding to the source signal, and in this case, refers to a mapping system variable corresponding to a gear signal; x is the source signal, which refers to the gear signal in this case.

The target signal y is set to the mapping system variable "GearSys"; the source signal x is set to a gearbox gear signal "0/CAN_FD_Powertrain/Engine/GearBoxInfo/Gear" from the CAN bus, which means CAN channel 1, network name "CAN_FD_Powertrain", sending ECU "Engine", message name "GearBoxInfo", signal name "Gear".

The method of calculating the target signal value is:

$$GearSys = \text{Gear} * a + \delta$$

wherein a=1 and δ=0.

The above mapping relationship between the source signal and the target signal is created, and the following mapping expression and mapping parameters are stored into the mapping execution container:

(1) a=1
(2) δ=0
(3) the type value of the mapping direction=from source signal to target signal
(4) the formula of the target signal value: GearSys=Gear*a+δ.

Figure 3:
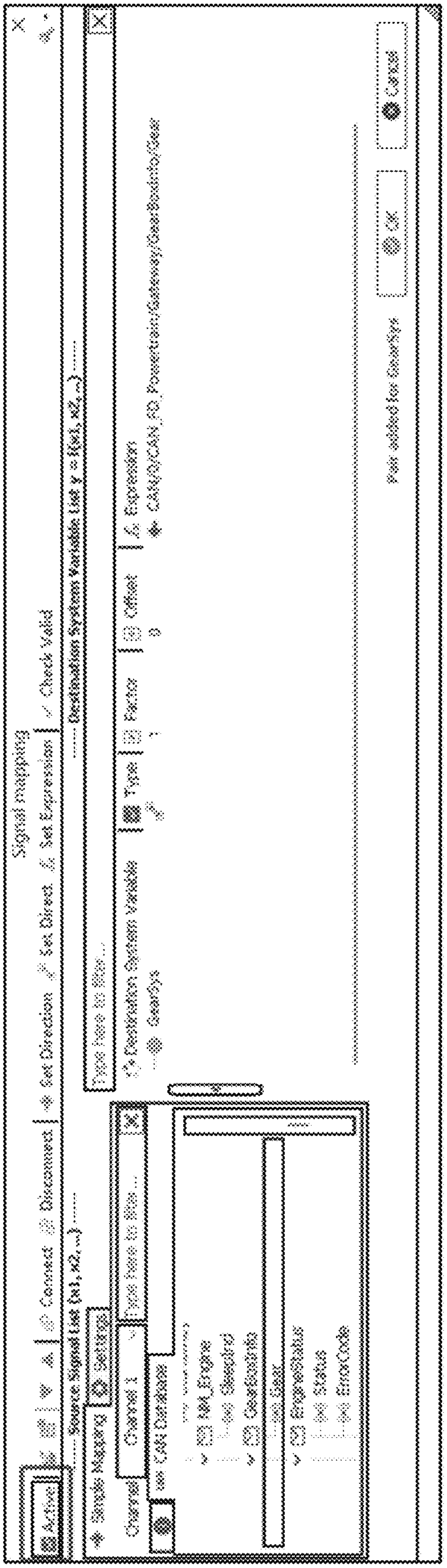
FIG. 3 is a schematic diagram illustrating a case of an adaptive update method of signal data according to some embodiments of the present disclosure.

As shown in FIG. 3, the execution switch of the mapping execution container is re-set to be on, so as to activate the mapping relationship.

The adaptive update method of signal data will be detailed below with one complete case.

It is assumed that in a vehicle test, it is required to monitor a real-time power of a direct current motor and draw a change curve of power in real time in a curve diagram. In order to collect a terminal voltage and current of the motor from the CAN bus, it is required to create unidirectional mapping from the source signal to the target signal. First, the mapping expression is set to y=x1*x2, where x1 and x2 are source signals, x1 represents a terminal voltage of the motor, x2 represents a current of the motor, and y refers to the target signal which is a mapping system variable corresponding to the motor power.

The target signal y is set to the mapping system variable "Power"; the source signal x1 is set to a terminal voltage signal "0/MotorTest/Motor/SensorInfo/Voltage" of the motor from the CANbus, which means CAN channel 1, network name "MotorTest", sending ECU "Motor", message name "SensorInfo", signal name "Voltage". The source signal x2 is set to a current signal "0/MotorTest/Motor/SensorInfo/Current" of the motor from the CAN bus, which means CAN channel 1, network name "MotorTest", sending ECU "Motor", message name "SensorInfo", signal name "Current".

The above mapping relationship between the source signal and the target signal is created, and the following mapping expression and mapping parameters are stored into the mapping execution container:

(1) mapping expression: y=x1*x2

(2) the number of the source signals: n=2

(3) the independent variable x1="0/MotorTest/Motor/SensorInfo/Voltage"

(4) the independent variable x2="0/MotorTest/Motor/SensorInfo/Current".

Figure 4:
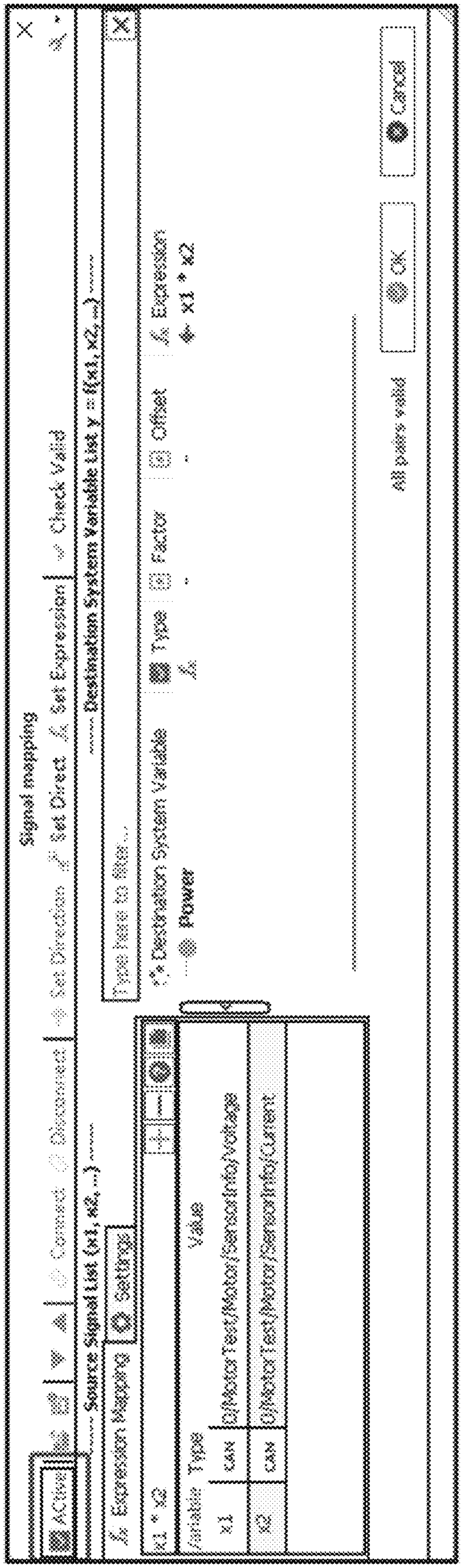
FIG. 4 is a schematic diagram illustrating a case of an adaptive update method of signal data according to some embodiments of the present disclosure.

As shown in FIG. 4, the execution switch of the mapping execution container is re-set to be on, so as to activate the mapping relationship.

Figure 5:
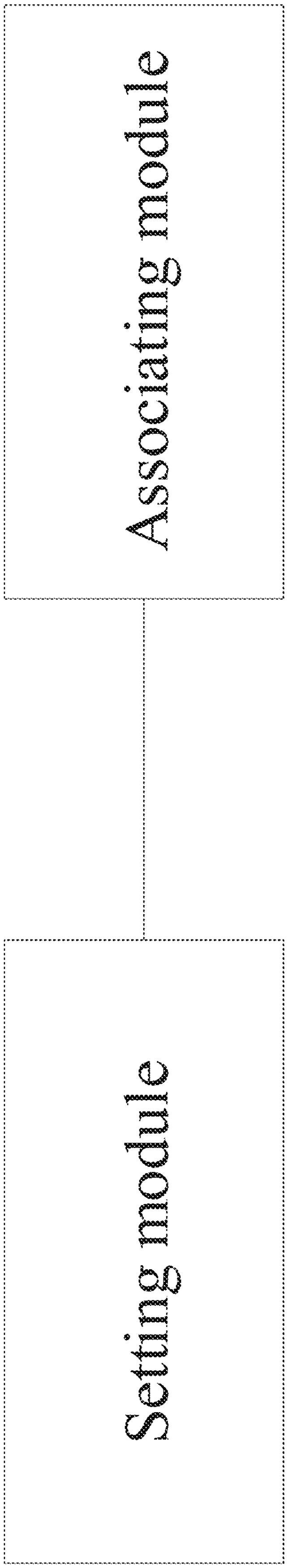
FIG. 5 is a block diagram illustrating a principle of an adaptive update method of signal data according to some embodiments of the present disclosure.

As shown in FIG. 5, some embodiments further provide an adaptive update system of signal data, which includes a computer device; wherein, the computer device is configured to include:

a setting module, configured to set a mapping expression between a source signal and a target signal to a linear type, and configure mapping parameters: a mapping amplification factor, an offset amount and a mapping direction; or, set the mapping expression between the source signal and the target signal to a nonlinear type, and configure parameters of the mapping expression; wherein, a method of configuring the parameters of the mapping expression includes:

based on a number n of the source signals, creating independent variables x1, x2 . . . xn;

setting the mapping expression to y=f (x1, x2 . . . xn);

associating each independent variable with the signal in a system or an expression result y; and, an associating module, configured to store the mapping expression, the mapping parameters or the parameters of the mapping expression into a mapping execution container to create a mapping relationship between the source signal and the target signal, and activate the mapping relationship to realize adaptive update of signal data.

The specific functions of the setting module and the associating module can be implemented in the computer device. Reference can be made to the contents of the above adaptive update method of signal data for details, and no redundant descriptions are made herein.

From the angle of hardware processing, an electronic device in the embodiments of the present disclosure will be described.

No limitations are made for the specific implementation of the electronic device in the embodiments of the present disclosure.

Figure 6:
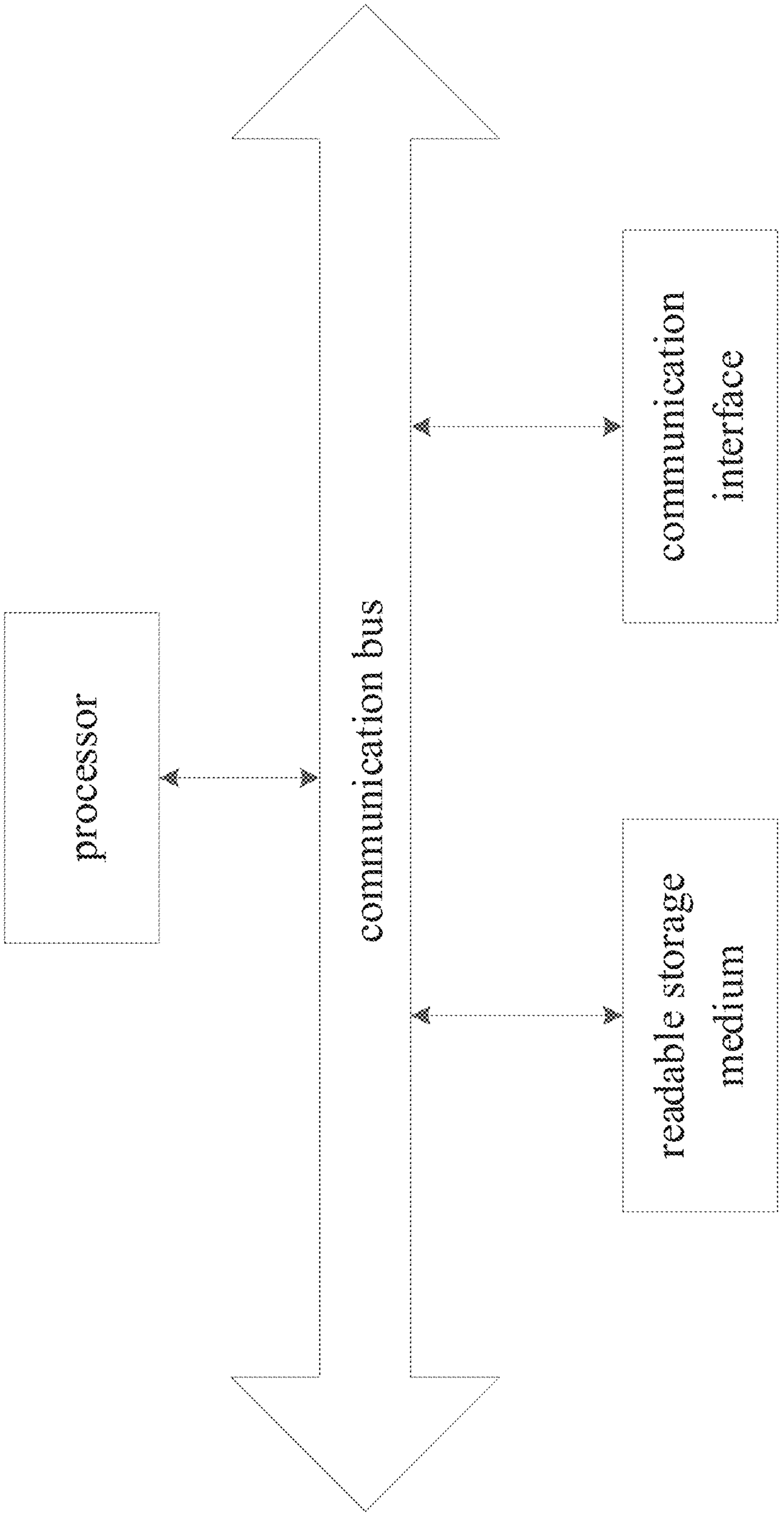
FIG. 6 is a block diagram illustrating a principle of an electronic device according to some embodiments of the present disclosure.

As shown in FIG. 6, some embodiments further provide an electronic device, including: a processor, a readable storage medium, a communication bus and a communication interface, wherein the processor, the readable storage medium and the communication interface perform mutual communication via the communication bus; the readable storage medium is configured to store programs of performing the adaptive update method of signal data, and the programs cause the processor to perform the operations corresponding to the adaptive update method of signal data.

Figure 7:
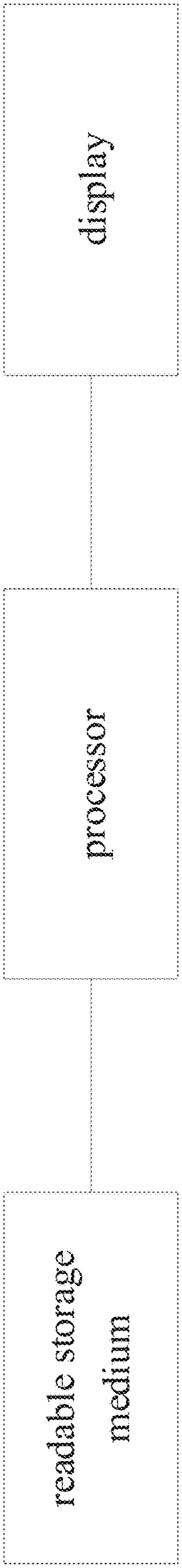
FIG. 7 is a block diagram illustrating a principle of an electronic device according to some embodiments of the present disclosure.

As shown in FIG. 7, some embodiments further provide an electronic device, including: a processor, a display communicating with the processor to present a signal mapping setting interface and a readable storage medium; wherein, the readable storage medium is configured to store instruction programs;

the processor is configured to execute the instruction programs so as to perform the operations of: setting a mapping expression and mapping parameters; creating a mapping execution container; storing the mapping expression and the mapping parameters into the mapping execution container to create a mapping relationship of a source signal and a target signal and activating the mapping relationship;

the display is configured to display the mapping expression and the mapping parameters in the signal mapping setting interface.

In some embodiments, the computer device and the industrial control computer may also serve as one of the electronic devices.

The structures shown in FIGS. 6 and 7 do not constitute any limitation to the electronic device, and the electronic device may further include more or less components than shown in the drawings or combine some components or have different component deployments.

In some embodiments, the communication interface may be RS232, RS485, USB interface or TYPE interface or the like, which may be connected with an external bus adapter. The communication interface may also include wired or wireless network interface. The network interface may optionally include wired interface and/or wireless interface (such as WI-FI interface, Bluetooth interface and the like), which is usually used to establish communication connection between the server and other computer devices.

The readable storage medium or the computer readable storage medium includes at least one type of memories. The memory includes flash memory, harddisk drive, multimedia card, card type memory (e.g. SD memory or the like), magnetic memory, magnetic disk or compact disk or the like. In some embodiments, the memory may be an internal storage unit in the computer device, for example, a harddisk drive of the computer device. In some other embodiments, the memory may also be an external storage device of the computer device, for example, a plug type hard disk drive, a smart media card (SMC), a secure digital (SD) card, a flash card or the like on the computer device. Furthermore, the memory may include both the internal storage unit in the computer device and the external storage device. The memory may be used to not only store an application software installed on the computer device and various types of data, for example, the codes of the computer programs and the like but also temporarily store data already output or to be output.

In some embodiments, the processor may be a central processing unit (CPU), a processor, a controller, a microcontroller, a microprocessor or another data processing chip, which is used to run the program codes in the memory or process the data, for example, execute the computer programs or the like.

In some embodiments, the communication bus may also be an input/output bus, which may be a Peripheral Component Interconnect (PCI) bus, or an Enhanced Industry Standard Architecture (EISA) bus or the like. The bus may include an address bus, a data bus and a control bus and the like.

Optionally, the computer device may also include a user interface, which may include a display, and an input unit, for example, a keyboard. Optionally, the user interface may also include a standard wired interface and wireless interface. Optionally, in some embodiments, the display may be an LED display, a liquid crystal display, a touch liquid crystal display and an Organic Light-Emitting Diode (OLED) touch display and the like. The display may also be appropriately referred to as display screen or display unit for displaying information processed in the computer device as well as a visual user interface.

The processor executes the programs to perform the steps in the embodiments of the adaptive update method of signal data shown in FIG. 1, for example, the steps S101 to S102 in FIG. 1. Alternatively, the processor executes computer programs to perform the functions of each module or unit in the above apparatus embodiments.

Some embodiments further provide a computer readable storage medium, which is configured to store programs of performing any one of the above adaptive update methods of signal data.

Some embodiments further provide a computer readable storage medium, storing computer readable instructions, where the computer readable instructions are executed by at least one processor to perform the above adaptive update method of signal data, which specifically includes: setting a mapping expression and mapping parameters; creating a mapping execution container; storing the mapping expression and the mapping parameters into the mapping execution container to create a mapping relationship of a source signal and a target signal and activating the mapping relationship. For detailed descriptions, reference can be made to the above adaptive update method of signal data and no redundant descriptions are made herein.

Some embodiments further provide a computer program product, including computer programs or instructions, wherein the computer programs or instructions are executed on a computer to cause the computer to perform any one of the above adaptive update methods of signal data.

Some embodiments further provide a computer program product, including a computer readable storage medium, storing computer readable program codes, wherein the computer readable program codes include instructions which cause at least one processor or one or more computer devices to perform the operations of: setting a mapping expression and mapping parameters; creating a mapping execution container; storing the mapping expression and the mapping parameters into the mapping execution container to create a mapping relationship of a source signal and a target signal and activating the mapping relationship.

In the several embodiments provided by the present disclosure, it should be understood that the disclosed device and method can be implemented another way. The above device embodiments are merely illustrative, for example, the flowcharts or block diagrams in the drawings show possible system architectures, functions and operations of the device, method, and computer program product in the several embodiments provided by the present disclosure. Thus, each block in the flowcharts or block diagrams may represent one module, one program fragment or one part of codes. The module, the program fragment or the part of codes includes one or more executable instructions for implementing the specified logic functions. It should be noted that in some alternative embodiments, the functions indicated in the blocks may also be performed in a sequence different from that indicated in the drawings. For example, two continuous blocks can be actually performed basically in parallel, and sometimes may be performed in a reverse sequence, which is dependent on the functions involved. It is further noted that each block in the block diagrams and/or flowcharts and the combinations of the blocks in the block diagrams and/or flowcharts may be implemented by a dedicated hardware-based system for executing specified functions or actions, or by combination of dedicated hardware and computer instructions.

Furthermore, the functional modules in the embodiments of the present disclosure can be integrated into one independent part, or exist as separate modules or two or more of the modules are integrated into one independent part.

The functions, when implemented by software function modules and sold or used as independent products, can be stored in one computer readable storage medium. Based on such understanding, the essence of technical solutions of the present disclosure, or a part contributing to the prior arts or a part of the technical solutions can be embodied in the form of software product. The computer software product is stored in one storage medium which includes several instructions to enable one computer device (for example, a personal computer, a server, or a network device or the like) to perform all or part of the steps of the method of each of the embodiments of the present disclosure.

Enlightened by the ideal embodiments of the present disclosure, relevant workers can, based on the contents of the specification, make various changes and modifications within the scope of protection of the technical idea of the present disclosure. The technical scope of the present disclosure is not limited to the contents of the specification but to the technical scope claimed by the claims.

What is claimed is:

1. An adaptive update method of signal data, comprising:

setting a mapping expression between a source signal and a target signal to a linear type, and configuring mapping parameters: a mapping amplification factor, an offset amount, and a mapping direction; or setting the mapping expression between the source signal and the target signal to a nonlinear type, and configuring parameters of the mapping expression, wherein:

a method of configuring the parameters of the mapping expression comprises:

based on a number n of the source signal, creating independent variables x1, x2 . . . xn;

setting the mapping expression to y=f (x1, x2 . . . xn); and associating each of the independent variables x1, x2 . . . xn with a signal in a system or a mapping expression result y; and storing the mapping expression, the mapping parameters, or the parameters of the mapping expression into a mapping execution container to create a mapping relationship between the source signal and the target signal, and activating the mapping relationship to cause a vehicle bus tool to automatically execute the mapping relationship in order to realize an adaptive update of the signal data, wherein:

a method of processing the signal in the system by using the adaptive update method of signal data comprises:

dynamically drawing, in a graphics window of the vehicle bus tool and in real time, a signal data change curve of a mapping system variable corresponding to the target signal.

2. The adaptive update method of signal data according to claim 1, wherein:

the mapping direction comprises a unidirectional mapping and a bidirectional mapping;

the unidirectional mapping comprises mapping from the source signal to the target signal or from the target signal to the source signal; and the bidirectional mapping comprises mapping from the source signal to the target signal while mapping from the target signal to the source signal.

3. The adaptive update method of signal data according to claim 2, wherein:

when mapping is performed from the source signal to the target signal, a method of calculating a target signal value comprises:

$$Mz = Yz * a + \delta;$$

and, when mapping is performed from the target signal to the source signal, a method of calculating a source signal value comprises:

$$Yz = (Mz - \delta)/a;$$

wherein Mz is the target signal value; Yz is the source signal value; a is the mapping amplification factor; and δ is the offset amount.

4. The adaptive update method of signal data according to claim 3, wherein:

a method of storing the mapping expression and the mapping parameters into the mapping execution container to create the mapping relationship between the source signal and the target signal comprises:

storing a, δ, a type value of the mapping direction, and Mz=Yz*a+δ into the mapping execution container.

5. The adaptive update method of signal data according to claim 3, wherein:

a method of storing the mapping expression and the mapping parameters into the mapping execution container to create the mapping relationship between the source signal and the target signal comprises:

storing a, δ, a type value of the mapping direction, and Yz=(Mz−δ)/a into the mapping execution container.

6. The adaptive update method of signal data according to claim 1, wherein:

the signal in the system comprises at least one of a bus signal, a mapping system variable, and a constant.

7. The adaptive update method of signal data according to claim 1, wherein:

a method of storing the mapping expression and the parameters of the mapping expression into the mapping execution container to create the mapping relationship between the source signal and the target signal comprises:

storing the number n of the source signal, the mapping expression y=f (x1, x2 . . . xn), and information for associating each of the independent variables x1, x2 . . . xn with the signal in the system or the mapping expression result y into the mapping execution container.

8. The adaptive update method of signal data according to claim 1, wherein:

a method of activating the mapping relationship comprises:

setting an execution switch of the mapping execution container to be on.

9. A non-transitory computer readable storage medium, storing computer readable instructions, wherein the computer readable instructions are executed by at least one processor to perform the adaptive update method of the signal data according to claim 1.

10. An electronic device, comprising a processor, a non-transitory computer readable storage medium, a communication bus, and a communication interface, wherein the processor, the non-transitory computer readable storage medium, and the communication interface perform mutual communication via the communication bus; and the non-transitory computer readable storage medium is configured to store programs of performing the adaptive update method of the signal data according to claim 1, and the programs cause the processor to perform operations corresponding to the adaptive update method of the signal data.

11. An electronic device, comprising a processor, a display communicating with the processor to present a signal mapping setting interface, and a non-transitory computer readable storage medium, wherein:

the non-transitory computer readable storage medium is configured to store instruction programs;

the processor is configured to execute the instruction programs to perform the adaptive update method of the signal data according to claim 1; and the display is configured to display the mapping expression and the mapping parameters in the signal mapping setting interface.

12. An adaptive update system of signal data, comprising a computer device, wherein the computer device comprises:

a processor;

a non-transitory computer readable storage medium;

a setting module, configured to set a mapping expression between a source signal and a target signal to a linear type, and configure mapping parameters: a mapping amplification factor, an offset amount, and a mapping direction; or set the mapping expression between the source signal and the target signal to a nonlinear type, and configure parameters of the mapping expression, wherein:

a method of configuring the parameters of the mapping expression comprises:

based on a number n of the source signal, creating independent variables x1, x2 . . . xn;

setting the mapping expression to y=f (x1, x2 . . . xn); and associating each of the independent variables x1, x2 . . . xn with a signal in a system or a mapping expression result y; and an associating module, configured to store the mapping expression, the mapping parameters, or the parameters of the mapping expression into a mapping execution container to create a mapping relationship between the source signal and the target signal, and activate the mapping relationship to cause a vehicle bus tool to automatically execute the mapping relationship in order to realize an adaptive update of the signal data, wherein:

a method of processing the signal in the system by using the adaptive update method of signal data comprises:

dynamically drawing, in a graphics window of the vehicle bus tool and in real time, a signal data change curve of a mapping system variable corresponding to the target signal.

13. The adaptive update system of signal data according to claim 12, wherein:

the mapping direction comprises a unidirectional mapping and a bidirectional mapping;

the unidirectional mapping comprises mapping from the source signal to the target signal or from the target signal to the source signal; and the bidirectional mapping comprises mapping from the source signal to the target signal while mapping from the target signal to the source signal.

14. The adaptive update system of signal data according to claim 13, wherein:

when mapping is performed from the source signal to the target signal, a method of calculating a target signal value comprises:

$$Mz = Yz * a + \delta;$$

and, when mapping is performed from the target signal to the source signal, a method of calculating a source signal value comprises:

$$Yz = (Mz - \delta)/a;$$

wherein Mz is the target signal value; Yz is the source signal value; a is the mapping amplification factor; and δ is the offset amount.

15. The adaptive update system of signal data according to claim 14, wherein:

a method of storing the mapping expression and the mapping parameters into the mapping execution container to create the mapping relationship between the source signal and the target signal comprises:

storing a, δ, a type value of the mapping direction, and $Mz=Yz*a+\delta$ into the mapping execution container.

16. The adaptive update system of signal data according to claim 14, wherein:

a method of storing the mapping expression and the mapping parameters into the mapping execution container to create the mapping relationship between the source signal and the target signal comprises:

storing a, δ, a type value of the mapping direction, and $Yz=(Mz-\delta)/a$ into the mapping execution container.

17. The adaptive update system of signal data according to claim 12, wherein:

the signal in the system comprises at least one of a bus signal, a mapping system variable, and a constant.

18. The adaptive update system of signal data according to claim 12, wherein:

a method of storing the mapping expression and the parameters of the mapping expression into the mapping execution container to create the mapping relationship between the source signal and the target signal comprises:

storing the number n of the source signal, the mapping expression y=f (x1, x2 . . . xn), and information for associating each of the independent variables x1, x2 . . . xn with the signal in the system or the mapping expression result y into the mapping execution container.

19. The adaptive update system of signal data according to claim 12, wherein:

a method of activating the mapping relationship comprises:

setting an execution switch of the mapping execution container to be on.

* * * * *